Figure 1:
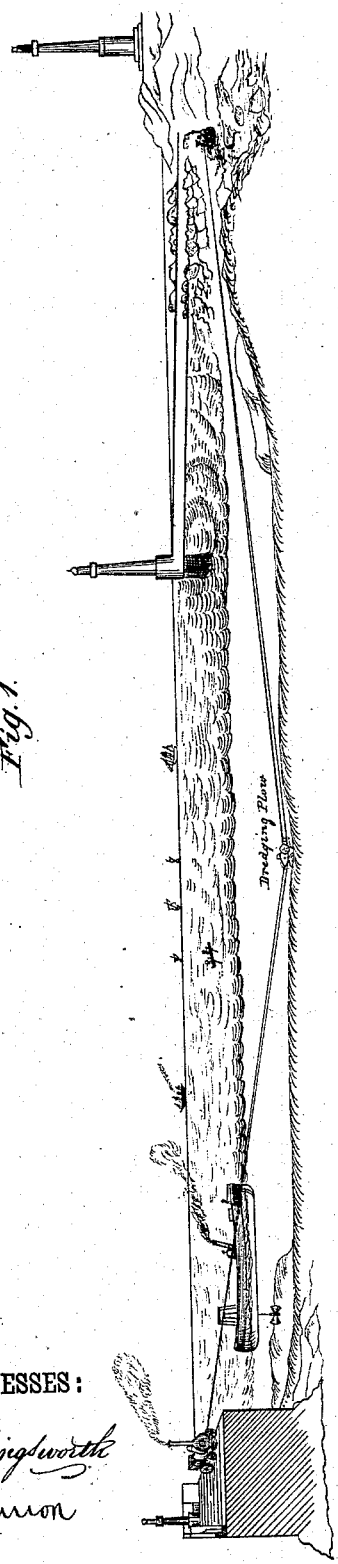

(No Model.) 7 Sheets—Sheet 1.
W. SMITH.
EXCAVATING AND DREDGING APPARATUS.
No. 284,503. Patented Sept. 4, 1883.

WITNESSES:
W. W. Hollingsworth
John E. Kenon

INVENTOR:
Wm Smith
BY
ATTORNEYS.

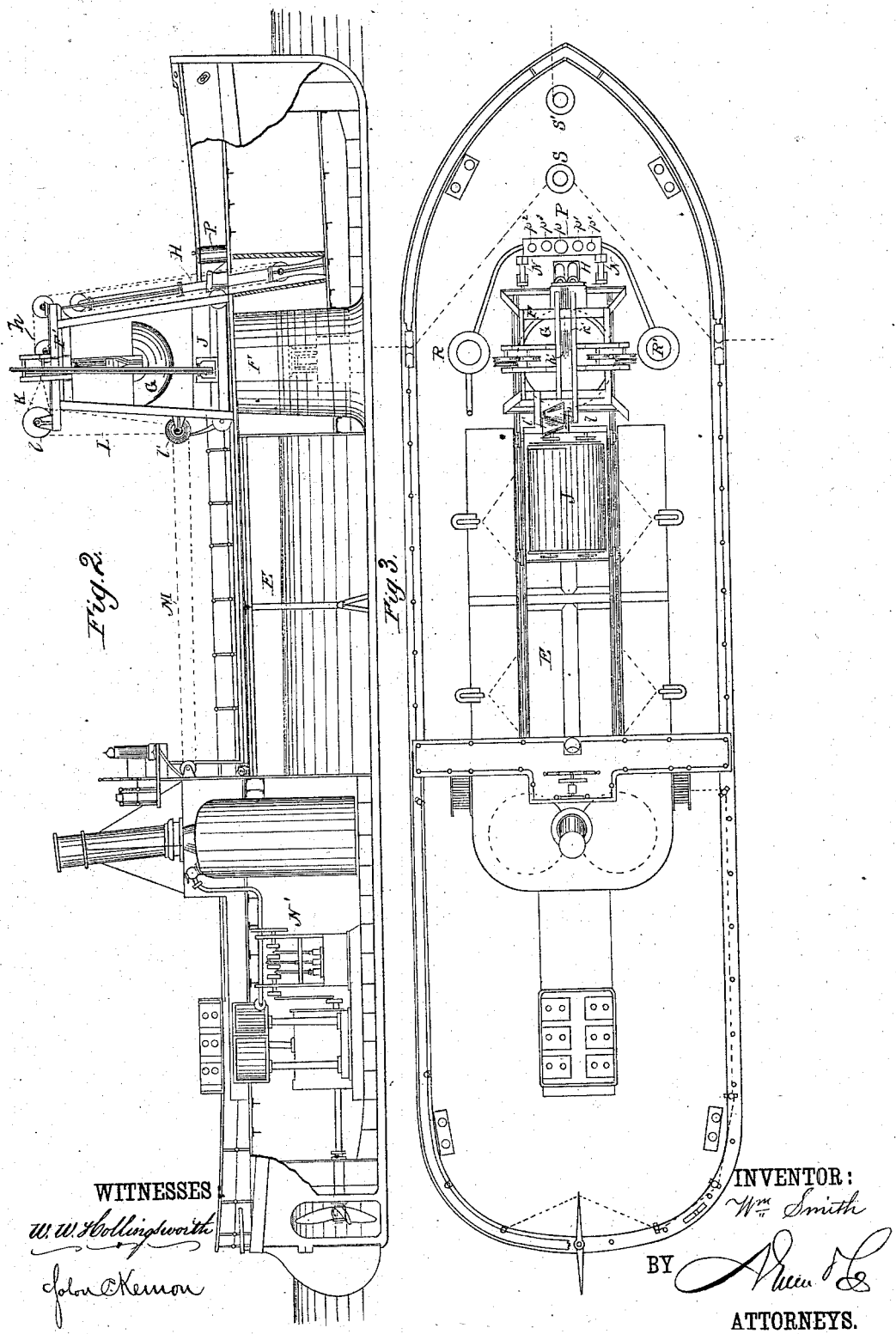

(No Model.) 7 Sheets—Sheet 3.
W. SMITH.
EXCAVATING AND DREDGING APPARATUS.
No. 284,503. Patented Sept. 4, 1883.
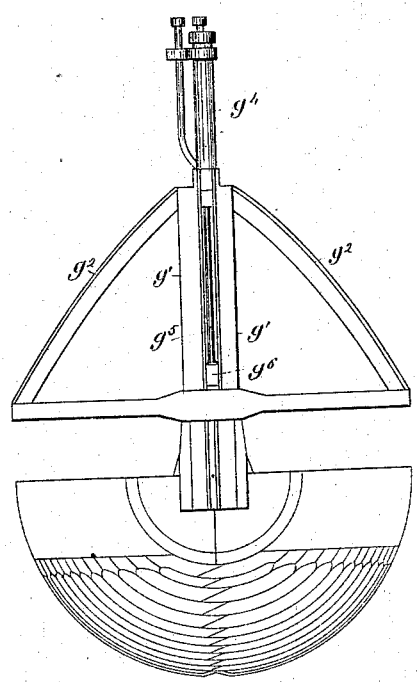
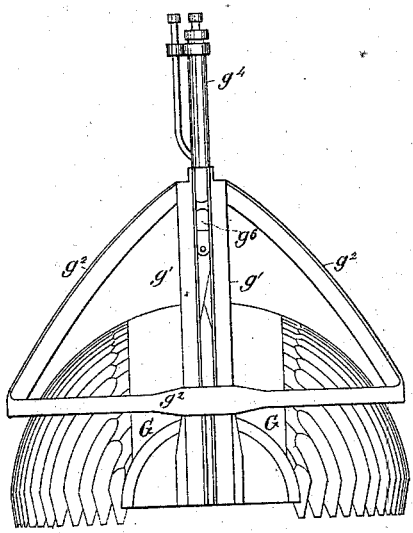
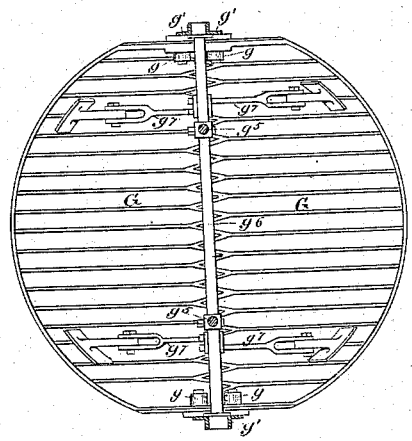
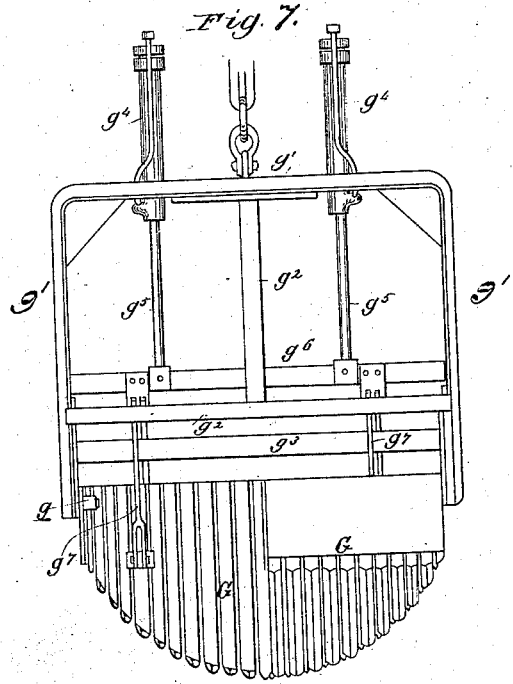
WITNESSES:
INVENTOR:
ATTORNEYS.

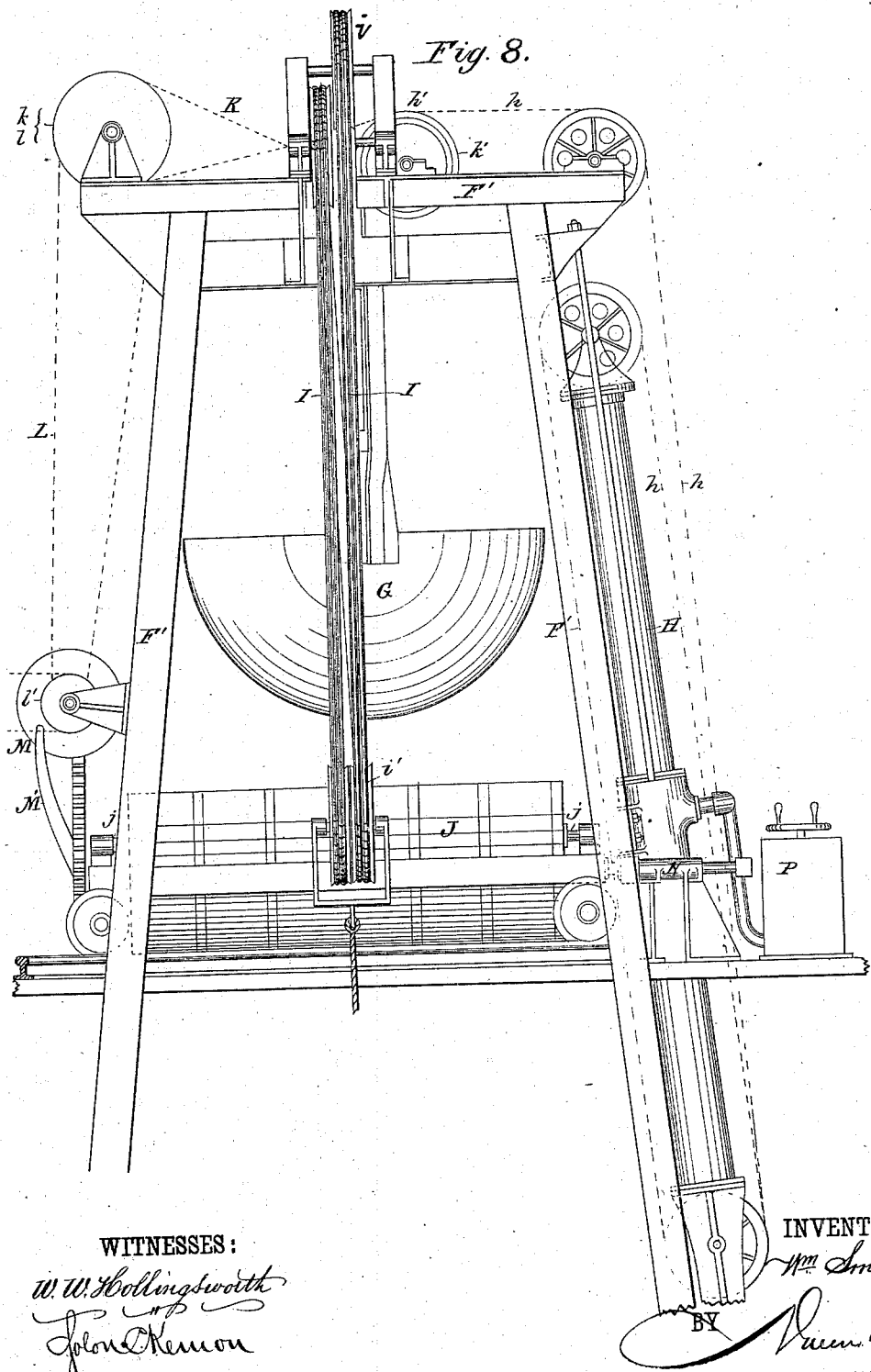

(No Model.) 7 Sheets—Sheet 5.
W. SMITH.
EXCAVATING AND DREDGING APPARATUS.
No. 284,503. Patented Sept. 4, 1883.
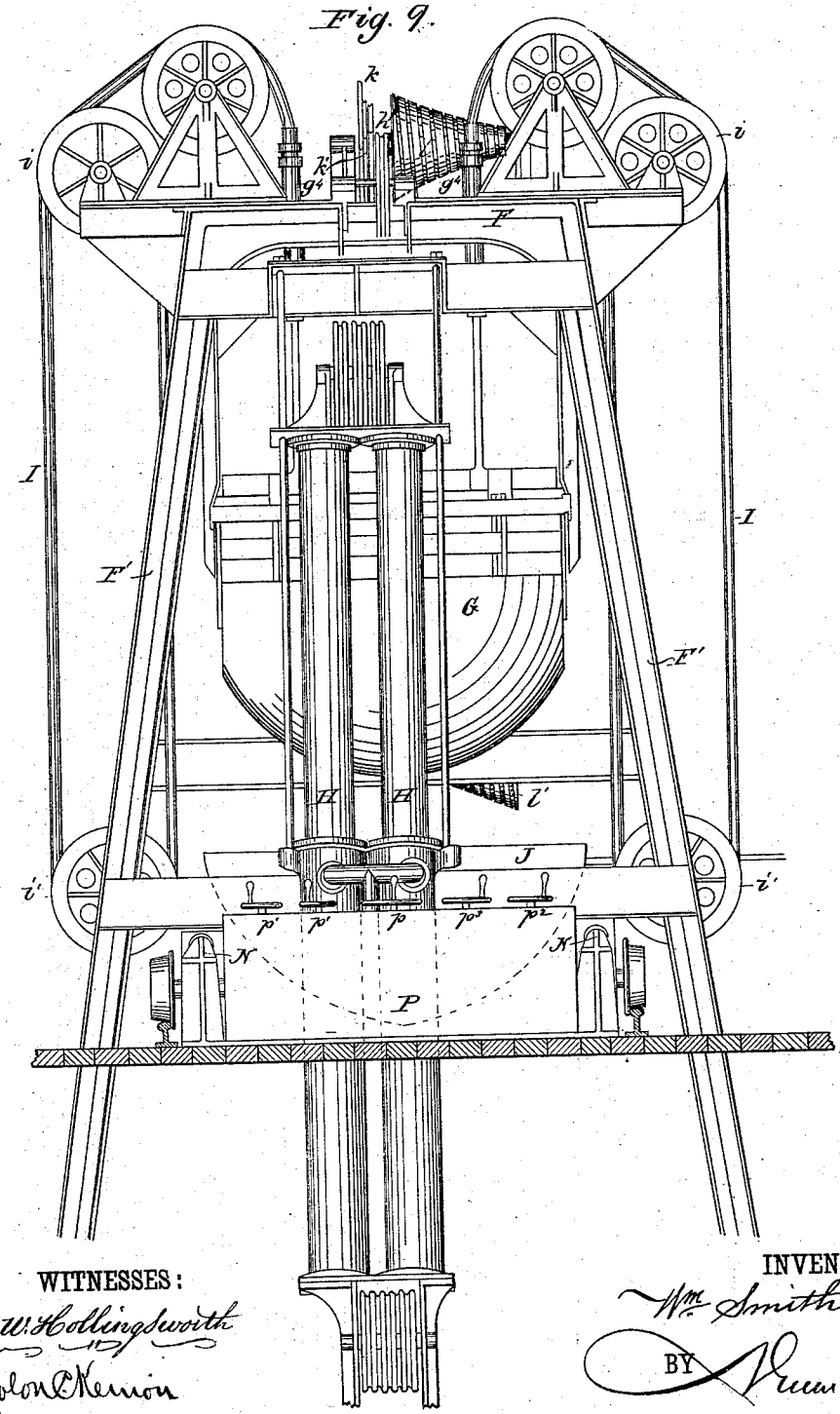

(No Model.)
7 Sheets—Sheet 6.

W. SMITH.
EXCAVATING AND DREDGING APPARATUS.

No. 284,503. Patented Sept. 4, 1883.

WITNESSES:
W. W. Hollingsworth
John C. Kenon

INVENTOR:
Wm Smith
BY
ATTORNEYS.

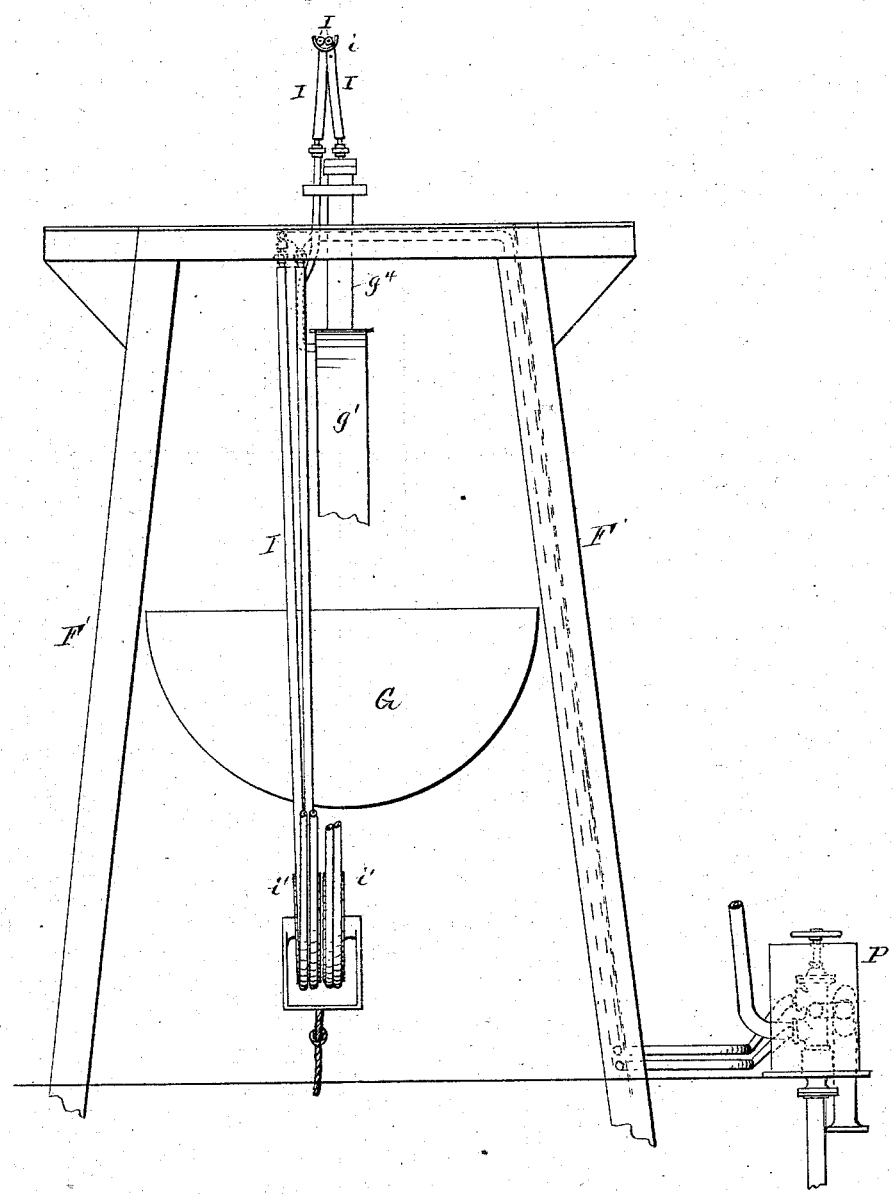

UNITED STATES PATENT OFFICE.

WILLIAM SMITH, OF ABERDEEN, SCOTLAND.

EXCAVATING AND DREDGING APPARATUS.

SPECIFICATION forming part of Letters Patent No. 284,503, dated September 4, 1883.

Application filed October 16, 1882. (No model.) Patented in England March 24, 1882, No. 1,417, and in France September 6, 1882, No. 150,990.

*To all whom it may concern:*

Be it known that I, WILLIAM SMITH, of Aberdeen, North Britain, have invented a new and Improved Excavating and Dredging Apparatus; and I do hereby declare that the following is a full, clear, and exact description of the same, reference being had to the accompanying drawings, forming part of this specification.

This invention relates to improvements in appliances for dredging-machines, in which a system of dredging is used, resembling the plowing of land, by means of two winding-engines hauling a plow to and fro between them by ropes; but for the plow, as used for cultivating land, is substituted a dredging-plow, which, when drawn over the bottom of the water-way, channel, harbor, or other place, both plows or scrapes up the sand or soil and transports it to the sides of the channel, whence it can be raised when the weather is favorable.

The invention consists of excavating and raising apparatus or appliances for the removal of the sand or soil thus accumulated near the sides of the channel, said excavating and raising apparatus being worked by hydraulic power on board of steam hopper-barges, as hereinafter described.

The excavating and raising apparatus consists of a basket-digger or grab-bucket, which is lowered open, and closed, when it reaches the bottom, by hydraulic power so applied that the bucket is caused to dig into the soil and fill itself in the act of closing. The hydraulic power is conveyed to the hydraulic cylinders of the bucket by flexible hose-pipes, in two sets of two pipes, each of which respectively communicates with opposite ends of a cylinder. Each set is wound on two sets of blocks and pulleys, like tackle, so as to permit of the hose being paid out and wound in as the bucket (upon which the cylinder to which they are connected are fixed) is lowered and raised. The bucket is opened to discharge its contents by hydraulic power acting in the same cylinders by which it was closed. It is nearly hemispherical in shape, and is made in two segments, which work on pivots and open and close along the longitudinal center line of the bucket. The hopper-barge is constructed with a well for the excavating-bucket to work through, and provided with hydraulic multiplying-tackle, herein termed a "hydraulic jigger," for raising the bucket. The barge has a second or hopper well for the reception of the soil, closed at the bottom by doors raised by hydraulic power, and kept shut by locking-gear. A distributing-wagon is arranged to run fore and aft on a railway over this hopper and over the bucket-well, in order to receive the soil from the bucket and transfer the same to the hopper of the barge. This wagon is nearly semi-cylindrical in form, and made in two segments, hung on centers, so that on tripping the catch which holds the segments together the wagon will be opened by the weight of the soil and discharge the latter into the hopper, after which the segments will close together again by their own weight. This wagon is run back by the hydraulic jigger simultaneously with the raising of the basket digger or bucket, beneath which it comes when the latter reaches its highest position. After the bucket has discharged into the wagon the latter is started by the pressure of a buffer, forming a hydraulic ram, supplied with the exhaust-water and worked by the back-pressure of the hydraulic jigger, thus completing the automatic simultaneous action of the bucket and wagon.

Figure 10:
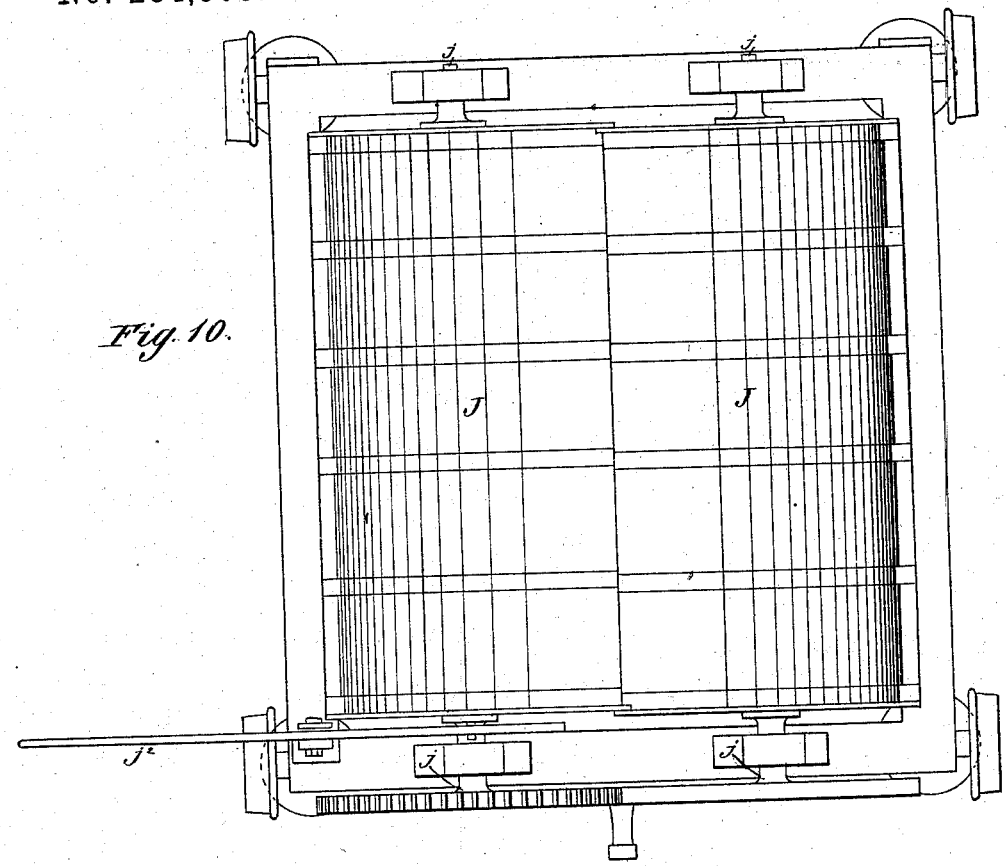
Figure 11:
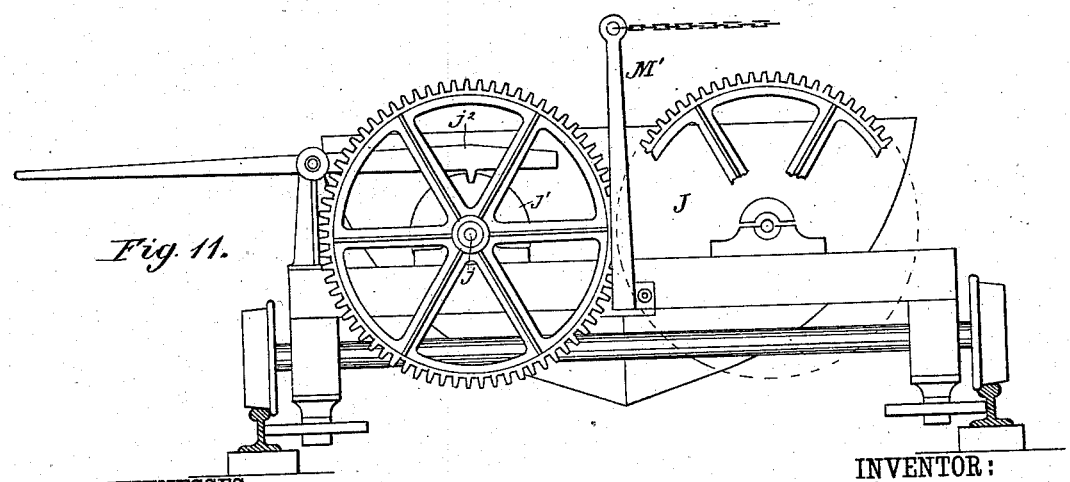

In the accompanying drawings, Figure 1 is a general view of the dredging operations herein described. Figs. 2 and 3 are a general section and plan of the dredging-hopper, in connection with the basket and operating mechanism shown in side view. Figs. 4, 5, 6, and 7 show different views of the excavator basket or bucket, Fig. 4 being an elevation closed, and Fig. 5 a similar view open, while Fig. 6 is a horizontal section just above the basket, and Fig. 7 is partly a section and partly an elevation at right angles to Fig. 4. Figs. 8 and 9 are elevations at right angles to one another of the hydraulic hoisting-gear for the excavating-basket. Figs. 10 and 11 are respectively a part plan and end elevation of the distributing-wagon drawn to a larger scale. Fig. 12 is a sectional elevation, showing in particular the pipes for supplying the hose and the cylinder for operating the basket or bucket segments.

Referring to Figs. 2 and 3, the hull of the dredging-hopper is constructed with a hopper-well, E, and an excavator-well, F, the latter being in the bow of the vessel. The well F is cylindrical and open at the bottom, and over it a gantry-frame, F', is erected and fitted with brackets to carry the gearing of the excavator-bucket G. This bucket is hung by a chain, h, rove over a number of sheaves on the hydraulic jigger H and on the gantry, and is raised and lowered by the chain and jigger. The bucket is almost hemispherical, and is made in two segments, (see Figs. 4 and 5,) and may be toothed or solid—i. e., made of plate-iron without toothed edges, according to the nature of the soil to be excavated. That shown is constructed of pointed tines or curvilinear bars of steel, bolted at their upper ends to semicircular frames, the points of the two segments intersecting, as shown, when closed. The frames have bosses to receive pins $g$, on which the segments of the bucket swivel, these pins being fixed in the suspending-frame $g'$ of the bucket, which is provided with a guard, $g^2$, to prevent the bucket catching against the bottom of the vessel, and is braced by a cross-bar, $g^3$.

$g^4$ $g^4$ are a pair of hydraulic cylinders fixed to the suspension-frame $g'$, and whose piston-rods $g^5$ are connected to a movable cross-bar, $g^6$, the ends of which work up and down in vertical guides in the suspending-frame $g'$. This bar is connected by two pairs of jointed links, $g^7$, with the two segments of the bucket, whereby when the bar $g^6$ is forced down by the hydraulic pistons the segments are closed, as shown in Fig. 4. The hydraulic power for opening and closing the bucket is conveyed to the opposite ends of the two cylinders $g^4$ by means of pairs of flexible hose-pipes I, (see Figs. 8, 9, and 12,) connected, respectively, therewith by screw-couplings. The hose-pipes, which should be able to withstand a pressure of two thousand pounds to the square inch, are rove over two sets of sheaves, $i$ $i'$, Figs. 8 and 9, the lower blocks of which rise to pay out the hose as the bucket is lowered and descend to take up the slack as it is raised. The two sets of hose are arranged at opposite sides of the gantry, and are both controlled by a double-acting supply and exhaust valve in the valve-chest P in front of the hydraulic jigger.

J is the wagon to receive the soil from the excavator-bucket G and distribute it over the hopper-well E. It runs on a railway laid over the wells E F, and is run fore and aft by the rising and falling of the excavators. The motion of the excavator jigger-chain is communicated from the top center pulley, $h'$, by a crossed wire rope, K, running upon a pair of V-grooved pulleys, $k$ $k'$, each pulley having three V-grooves for adjusting the ratio of the travel of the distributing-wagon to the depth of stroke of the excavator, the opposing diameters being arranged in manner as follows: twenty-four inch, twenty-two inch, twenty inch on speed-cone shaft, and sixteen inch, eighteen inch, twenty inch on jigger-chain shaft. The motion is communicated from the upper speed-cone, $l$, to the lower speed-cone, $l'$, by a pitch-chain, L, running in recesses in the speed-cones, the recesses being arranged in a spiral path round each cone to traverse the pitch-chain along the cones, and the cone $l$ hollowed to maintain uniform tension. The cone $l'$ drives an endless chain, M, to which the wagon is attached by an arm, M', as seen in Fig. 8. The velocity of the wagon is so varied by the cones that it travels fastest when under the excavator-bucket G.

N is a pair of modified spring-buffers, against which the wagon strikes. They are designed to be held back by spring-checks, which are also designed to be capable of being released on moving the hand of the hydraulic jigger-valve $p$ to lower the excavator.

The wagon J is constructed of two segments, each hung on swiveling-centers $j$, and opening along the longitudinal center line of the wagon. On the aft centers are a pair of intergearing toothed wheels, and on one a disk, $j'$, with a recess for the tooth of the tripping-lever $j^2$. When this lever is depressed, the tooth is lifted out of the recess and the sections of the wagon (their toothed wheels turning with each other) open by the weight of its contents, which drop into the well E. The segments then close together again by their own weight, and are secured by the tooth of the lever $j^2$ entering the recess in the disk through the intermeshing wheels, locking both sections. The tripping-lever $j^2$ may be depressed at any point in the journey of the distributing-wagon over the hopper-well to distribute the soil.

The hopper-well is closed at the bottom by a number of doors hinged to the keelson, and raised by separate hydraulic rams placed in the side wings and connected to the doors by chains. Each door is kept shut by a pitch chain and pulley with a toothed pinion on the same shaft as the pulley retained by a pawl. The pawls are tripped by a lever to open the hopper-doors.

The hydraulic power is supplied from a set of high-pressure pumps, driven by the steam-engines used for propelling the vessel when not dredging. The pumps are set on a cistern containing water or oil, which they pump to the valve-chest P, the hydraulic main pipe passing first to an accumulator, R, then to the valve-chest, and thence to the second accumulator, R', the capacity of these accumulators being sufficient to supply the hydraulic cylinders for closing the hopper-well doors, and to equalize the work of the pumps during the descent and rise of the excavator-bucket. There are five ordinary hydraulic valves in the chest P—viz., the jigger-valve $p$, communicating with the supply and exhaust pipes and jigger-cylinders, two valves, $p'$, for controlling the hydraulic capstans, hereinafter referred to, a hopper-door valve, $p^2$, and a double-acting supply and exhaust valve, $p^3$, for the excavator-cylinders.

S S' are the two hydraulic capstans to move the vessel ahead, astern, or sidewise when dredging. The capstan S has the side chains rove round it, so as to wind in on one side and pay out on the other. The capstan S' is to haul the vessel ahead against the current, or let her move astern.

I do not claim the mechanical parts composing the machinery herein described when taken separately or apart from the combination and application thereof in manner and for the purposes herein described; nor do I claim the construction and arrangement of the hydraulic machinery as described for excavating; but it will be understood that I reserve the right to make separate application for patent for the devices herein shown and described as the dredging plow or truck and its adjunctive parts.

Having thus fully described my invention, what I claim as new, and desire to secure by Letters Patent, is—

1. The combination, with the excavating bucket or basket, constructed of two segments and operated by hydraulic cylinders, as herein described, of flexible hose rove upon sets of sheaves and adapted to be paid out and taken up as the bucket is lowered and raised, substantially as shown and described.

2. The combination, with a dredging-hopper constructed with an excavator-well and with a hopper-well, of a suspended excavating bucket or basket constructed of two parts and operated by hydraulic power, together with flexible hose adapted to be paid out and taken up with the movement of the bucket or basket, and a wagon or receptacle capable of operation simultaneously with the operation of the bucket or basket, substantially as and for the purposes set forth.

3. The wagon composed of two pivoted-together segments or sections, with the axis of one section provided with a notched disk, in combination with the tripping-lever having a tooth or projection engaging with the notched disk, substantially as and for the purpose set forth.

The foregoing specification of my improvement in excavating and dredging apparatus signed by me this 9th day of September, 1882.

WILLIAM SMITH.

Witnesses:
THOMAS ROBERTSON GILLIS,
*Of the city of Aberdeen, North Britain, Solicitor.*
ALEXANDER CARNEGIE ROSS,
*Of the city of Aberdeen, North Britain, Law Apprentice.*